(12) United States Patent
Grace et al.

(10) Patent No.: US 8,240,672 B2
(45) Date of Patent: Aug. 14, 2012

(54) LOW BREAKOUT FRICTION ENERGIZED GASKET

(75) Inventors: Ronald L. Grace, Fallbrook, CA (US); Lionel A. Young, Murrieta, CA (US)

(73) Assignee: Flowserve Management Company, Irving, TX (US)

( * ) Notice: Subject to any disclaimer, the term of this patent is extended or adjusted under 35 U.S.C. 154(b) by 341 days.

(21) Appl. No.: 12/800,077

(22) Filed: May 7, 2010

(65) Prior Publication Data

US 2011/0272892 A1 Nov. 10, 2011

(51) Int. Cl.
*F16J 15/34* (2006.01)
*F16J 15/32* (2006.01)

(52) U.S. Cl. ........ 277/353; 277/390; 277/395; 277/551; 277/567

(58) Field of Classification Search .................. 277/353, 277/549, 551, 553, 555, 567, 390, 395
See application file for complete search history.

(56) References Cited

U.S. PATENT DOCUMENTS

| | | | |
|---|---|---|---|
| 3,901,517 A | 8/1975 | Heathcott | |
| 4,305,593 A | 12/1981 | Smith | |
| 4,566,702 A * | 1/1986 | Traub | 277/589 |
| 4,596,394 A | 6/1986 | Schmitt | |
| 4,655,945 A * | 4/1987 | Balsells | 508/106 |
| 4,658,847 A | 4/1987 | McCrone | |
| 5,137,259 A | 8/1992 | Stein | |
| 5,813,674 A | 9/1998 | Dickie et al. | |
| 5,992,856 A | 11/1999 | Balsells et al. | |
| 6,443,459 B2 | 9/2002 | Lebeau et al. | |
| 6,464,231 B2 | 10/2002 | Burroughs | |
| 6,951,337 B2 | 10/2005 | Lundberg | |
| 7,021,632 B2 | 4/2006 | Grace | |
| 7,055,825 B2 | 6/2006 | Watanabe et al. | |
| 7,240,904 B2 | 7/2007 | Droescher et al. | |

FOREIGN PATENT DOCUMENTS

| | | |
|---|---|---|
| EP | 0 277 484 A2 | 8/1988 |
| EP | 0 867 647 A2 | 9/1998 |

OTHER PUBLICATIONS

European Search Report for 11165207.9-2421, date completed Sep. 19, 2011, date mailed Sep. 28, 2011.

* cited by examiner

*Primary Examiner* — Vishal Patel
(74) *Attorney, Agent, or Firm* — Miller Canfield; Mark L. Maki

(57) ABSTRACT

A mechanical seal typically includes gaskets as secondary seals therein. An improved gasket is provided which has a U cup design wherein the gasket is formed with a first spring-energized groove which opens radially and has a deflectable sealing wall which is deflectable axially, and includes a second spring-energized groove which is canted at an angle relative to the axial and radial directions wherein the groove defines a sealing leg which is deflectable at an angle relative to the axial and radial directions. A support ring supports the canted sealing leg along the major extent thereof wherein an end portion of the canted sealing leg is disposed for sealing contact with an axially-extending component surface.

20 Claims, 3 Drawing Sheets

LOW BREAKOUT FRICTION ENERGIZED GASKET

FIELD OF THE INVENTION

The invention relates to a mechanical seal and a secondary seal therefor, and more particularly, to an energized gasket having a low breakout friction.

BACKGROUND OF THE INVENTION

Mechanical face seals are used on various types of machines and equipment, such as pumps, compressors, and turbines which have a rotating shaft and a sealing chamber adjacent the shaft wherein the mechanical seal prevents leakage of fluid from the sealing chamber. Many such mechanical seals include a pair of adjacent seal rings which have opposing seal faces that define a sealing region therebetween to sealingly separate the sealing chamber from an exterior region. Typically, one of the seal rings is mounted on the shaft so as to rotate therewith while the other stationary seal ring is non-rotatably mounted on a seal housing. Also, at least one of the rotating and stationary seal rings is axially movable. To maintain a seal between the opposed seal faces, the axially movable seal ring is axially loaded, such as by a spring or bellows, towards the other seal ring.

While the sealing region between the relatively rotatable seal faces defines the primary seal, secondary seals are provided between other adjacent components in the mechanical seal. For example, a secondary seal between the rotatable seal ring and the shaft or a shaft sleeve prevents migration of the sealed fluid therebetween, while a secondary seal between the stationary seal ring and a support element for the seal ring prevents migration of the sealed fluid between these components.

In spring biased seals, U.S. Pat. No. 5,813,674 discloses a non-bellows seal arrangement wherein a secondary seal between a seal ring and a seal ring holder is an annular gasket which has a U-shaped cup-like cross section and a spring disposed within the gasket to bias the gasket walls radially away from each other. Another seal arrangement having a spring energized plastic seal is disclosed in U.S. Pat. No. 6,116,610.

As such, there are a number of known annular gaskets available which use a spring actuated, pressure assisted cup design. These gaskets are typically machined from PTFE or plastic blended polymer based materials or Polyamid based resins that can be filled with graphite or other fillers to increase temperature or pressure limits. These materials are molded into bar form which resembles hard plastic at atmospheric temperatures.

U cup configured gaskets are machined from this molded bar, which gaskets are formed with a gasket groove and then require a spring to energize the thin cup lips or walls defined by the groove to form a seal when installed in an available cavity present in a mechanical seal. Normally these gasket shapes are designed to fit in a space approximately the size required for a standard cross section O ring. Spring designs which are fitted in the gasket groove to actuate the small machined cup can vary from; a wrapped formed ribbon material, an elliptical coil garter spring design, or as more commonly used, a small specially stamped and formed cantilever finger spring. Springs used to energize the U cups can be made from various metals for corrosion resistance or strength where high temperatures may otherwise yield the material.

These U cup gasket designs may be machined with horizontal opening U cups or vertically opening, radially inside or outside facing U cups. These small spring energized gaskets present an advantage when elastomers cannot be used due to extreme temperatures and/or corrosive environments. In some cases sliding friction or stiction between axially slidable seal components can be reduced in comparison to the use of elastomers which can swell, stick and deteriorate.

Parts can be machined from a wide variety of composite billet materials where pressure limits can be fairly high and cold flow and extrusion kept to a minimum. The gaskets are small in cross sections and provide their own sealing flexibility similar to that of a compressed O ring.

Typical construction of these self energized gaskets includes the machining of a cup shape to form the groove that is fitted with a spring and often opens toward the hydraulic pressure being sealed. Since the gasket is fully machined the cup can be machined horizontally or vertically. The spring installed in the cup shape provides initial sealing forces, wherein the gaskets are dimensioned to interfere with opposed sealing surfaces while the cup walls of the gasket can deflect to maintain contact with the opposing sealing surfaces. This sealing capability is enhanced as pressure is increased on the inside of the cup which thereby generates higher forces on the cup walls or lips to seal against the adjacent sealing surfaces. These designs are well suited for static sealing and hydraulic cylinder shaft sealing where actuator forces are high.

These known designs can be adequate for static services where both sealing surfaces of the cup walls abut against non-moving surfaces, even where hydraulic load applied to the inner cup surfaces in the groove is transferred to the adjoining sealing surface. However, tests have proven that as hydraulic pressure increases, the forces transmitted through the inner cup walls in contact with the abutting sealing surfaces increases. Hence the forces required to move one of the abutting surfaces in relation to the gasket sharply increases.

This calculation can be made by multiplying the gasket surface contact area by the hydraulic pressure times the coefficient of friction. At low product pressures, gasket surface loads are primarily being provided by the internal spring load. Under these conditions forces to move an abutting surface can be very low and reasonable for most applications where relative motion is required. The design principle of a machined U cup is to apply sealing forces equally to both sealing surfaces of the U cup, i.e., outside diameter to inside diameter, right to left etc.

Attempts to reduce sealing lip forces by relieving part of the gasket lip sealing surface and adding a support heal is less effective as pressures increase the deformation of the gasket.

As such, the application of these designs to mechanical seals for other than a static seal can pose critical problems. Using these known cup designs for a flexible rotating or stationary seal ring in a mechanical seal application can be problematic relative to maintaining seal face flatness and free axial movement of the seal ring relative to the seal sleeve. It becomes most noticeable when axial break out of friction forces at the gasket exceed the seal spring and hydraulic loading of the seal faces.

Hence, when known gaskets are used as a secondary seal particularly on a carbon structure mating seal ring, the internal forces of the gasket cup that are created initially by the spring and then further increased by hydraulic forces, apply a radial load relative to the carbon seal ring which acts radially on the seal ring. This force has a distortion effect on the lapped flat, sealing face and can cause excessive face heat and wear.

It is an object of the invention to provide an improved spring-energized gasket for use in mechanical seals as a secondary seal.

The gasket of the invention has special features which prove beneficial to applications in face type mechanical seals. In these seals, the seal rings can be made from very hard materials such as tungsten or silicon carbide, or softer materials such as mechanical grade carbon. The construction of the gasket is performed using a machining operation consistent with machining composite materials into various other configurations to form spring energized seals. The use of plastic compounds greatly reduces the stiction experienced with rubber compound gaskets.

Furthermore, the inventive gasket design is machined so as to be canted at a 45 degree angle relative to the diameter to be sealed. The new design configuration provides two features desirable to improve the performance of the gasket for use as a secondary gasket or seal for a mechanical seal face.

First, since the introduction of patterned or wavy face features on lapped mechanical seal faces, it is critical to remove external distortion effects on lapped sealing faces. Secondary gaskets that require squeeze or radial compression acting radially on the seal ring can put radial stresses on these faces which affect or alter the lapped configured sealing face. The canted self energized gasket of the invention, however, has a small vertically opening spring energized U cup preferably opening from its outside diameter. The gasket is captured in a groove so that the gasket is confined axially to apply just enough force to axially compress the outer gasket lip sufficiently to seal axially against the forward end of the groove. This seals the gasket to the seal ring without generating radial forces on the seal face.

Secondly, gasket sealing surfaces are flexible to move along the shaft or sleeve due to relative axial movement between the gasket and the equipment rotating shaft or other seal component. When this movement takes place, the secondary seal gasket of the seal ring slides on the component sealing surface to accommodate this axial movement. The gasket of the invention uses a canted, U shaped cup which is angled and spring energized to form a sealing lip which is biased against the opposing component surface. If the break-out friction of the gasket seal to the shaft, sleeve or other seal component is too high and exceeds the seal spring and hydraulic closing force, the mechanical seal faces may hang open with shaft motion causing excessive leakage and seal failure. The gasket has the canted, spring-energized U cup preferably located in the ID of the gasket, so as to seal the gasket to the shaft or sleeve or other seal component as necessary.

This gasket, however, does not apply radial forces through the mechanical seal face. Rather, the forward lip of the U cup is supported by an annular metal insert or support ring, preferably on the inside of the diameter of the gasket that supports the canted sealing lip except for the free end thereof which sealingly contacts the opposing component surface. The machined cup is designed with zero interference with the shaft or sleeve. Initial interference with the opposing seal component is achieved by the lip displacement caused by the spring which when installed holds the small lip in contact with the component surface. The support ring is machined to closely match the spring energized lip angle. As the gasket is installed over the sleeve, the lip angle changes and a slight gap exists between the support ring and the cup sealing lip. The lip thickness preferably is small, preferably less than 0.010", so that the canted sealing lip will be flexible under pressure and mate up against the metal support ring. This in turn reduces the pressure caused load of the lip on the sleeve or shaft as the metal support ring or insert is supporting the vast majority of the load due to pressure. Only the free end of the sealing lip extends radially beyond the support ring for unsupported contact with the shaft or sleeve.

This design still provides the advantages of known gasket constructions. But also, the canted U cup design with support ring provides superior performance in achieving low break-out and sliding friction. As hydraulic pressures increase, the friction forces resisting shaft or sleeve axial movement are much lower than other known U cup design arrangement. The design and testing of this self energized U cup proved to be superior in performance to any other U cup configuration tested. Break-out friction at low and high pressures proved to be much lower, more than 50% less than known gaskets, and sliding friction was reduced by similar amounts.

Other objects and purposes of the invention, and variations thereof, will be apparent upon reading the following specification and inspecting the accompanying drawings.

Figure 1:
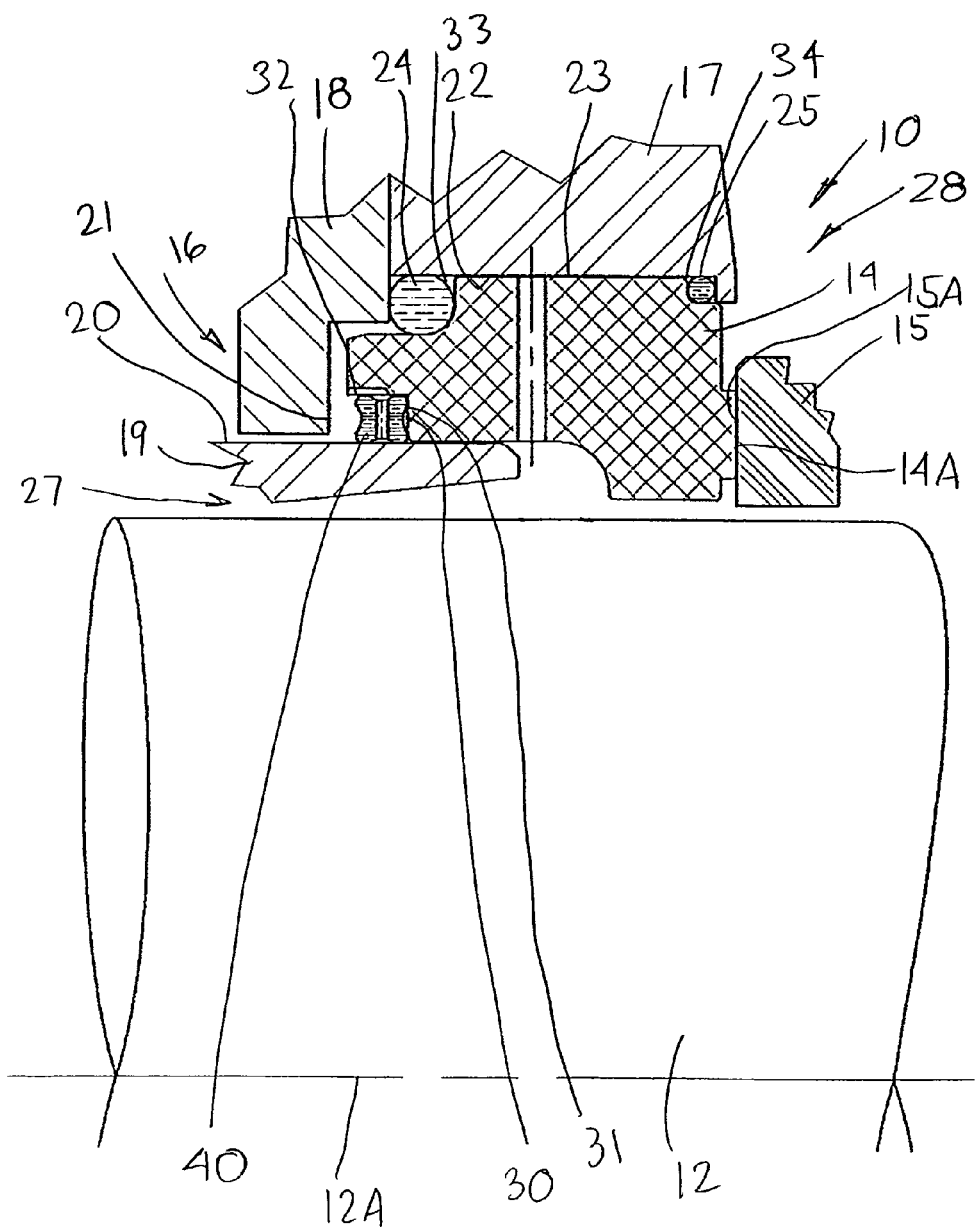
FIG. 1 is a cross-sectional view of a prior art mechanical seal assembly showing a gasket space defined therein.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, a conventional mechanical seal assembly 10 is shown mounted to a rotatable shaft 12. As described hereinafter, the invention relates to a gasket construction for use with various types of known mechanical seals including the seal 10 illustrated in FIG. 1 as well as other mechanical seals.

More particularly as to the mechanical seal construction, the mechanical seal 10 includes various seal components of different types and constructions which are assembled together to define the seal assembly. In this regard, the seal components of the mechanical seal 10 comprises a pair of relatively rotatable seal rings 14 and 15 wherein the seal ring 15 preferably is mounted to the shaft such as by a shaft sleeve or the other like component so that the seal ring 15 rotates in unison with the shaft 12. The mating seal ring 14 preferably is stationarily mounted to a housing assembly 16 which comprises a first housing component 17, a second housing component 18 disposed axially adjacent thereto, and an inner seal component 19 which extends circumferentially about the shaft axis 12A and has an outer component surface 20 which faces radially outwardly and defines a sealing surface. The adjacent housing component 18 also includes an axial facing component face 21 which faces towards the stationary seal ring 14. The aforementioned seal component 17 further includes a respective component face 22 which faces radially inwardly towards the outer circumferential surface 23 of the seal ring 14. The seal ring 14 is sealed on its outer diameter by secondary seals, preferably provided as O-rings 24 and 25 which sealingly contact the seal components 17 and 18.

The opposed seal rings 14 and 15 also include respective seal faces 14A and 15A which are disposed in opposed relation and define a radially-extending sealing region between the opposed faces 14A and 15A.

These seal faces 14A and 15A prevent the leakage of fluid from a first seal region or chamber 27 and a second seal region or chamber 28 which may include any of various types of fluids including process fluids, buffer and barrier fluids, and atmospheric fluids which may be gases or liquids. The inventive gasket arrangement described hereinafter is usable in a variety of configurations in which conventional secondary seals are provided.

More particularly, the prior art seal 10 of FIG. 1 has the seal ring 14 provided with an annular notch or pocket 30 on the back side thereof which is defined by an end face 31 which extends radially and a side face 32 which extends axially. The pocket 30 is defined on the inner side thereof by the component face 20 and is defined on the end opposite the end face 31 by the component face 21 described above. While the pocket 30 generally opens radially inwardly towards the component face 20, it also will be understood that the pocket in which the inventive gasket arrangement is provided can be provided in other configurations such as in an outward opening pocket like the pocket 33 for the O-ring 24, or the pocket 34 for the O-ring 25. These modifications may be made by a skilled artisan in view of the teachings provided herein.

In the prior art mechanical seal 10, an annular gasket 40 is provided in the pocket 30 which generally is in sealing contact with the radially opposed surfaces defined by the pocket side face 32 and the component face 20. It will be understood that these surfaces have an annular shape to essentially define an annular or endless shape for the pocket 30 so that the gasket 40 is ring-shaped. In view of the background of the invention described above, gaskets such as the gasket 40 have disadvantages associated therewith, particularly if there is relative axial movement between the opposed component faces 32 and 20. Hence, the description of the prior art described above and the problems associated therewith is equally applicable to the mechanical seal 10 disclosed herein.

Figure 2:
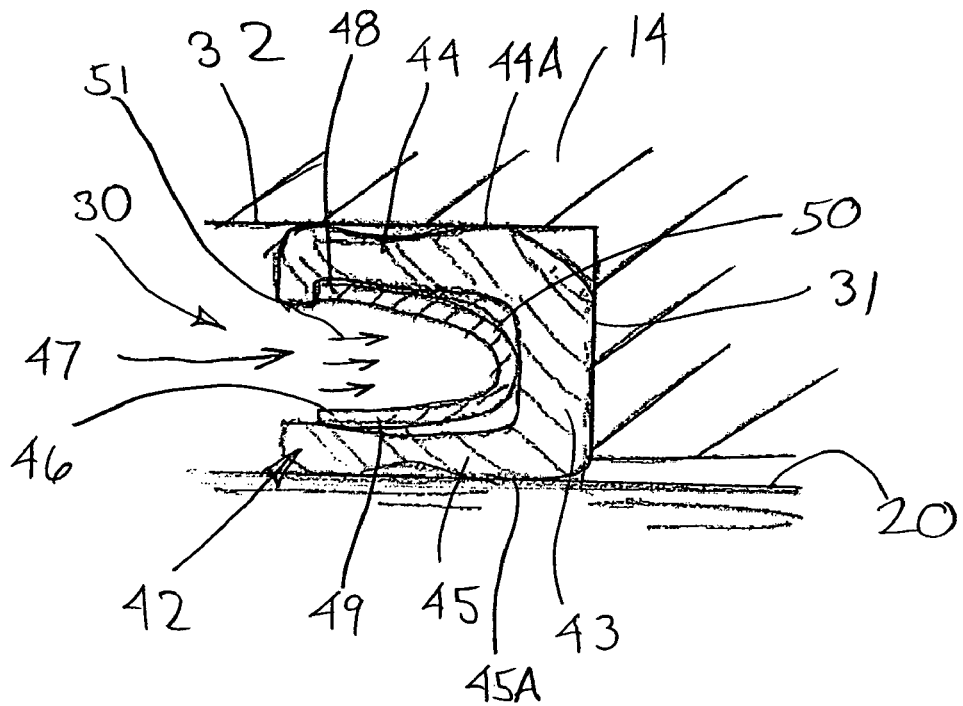
FIG. 2 illustrates a prior art gasket in a first configuration.
Figure 3:
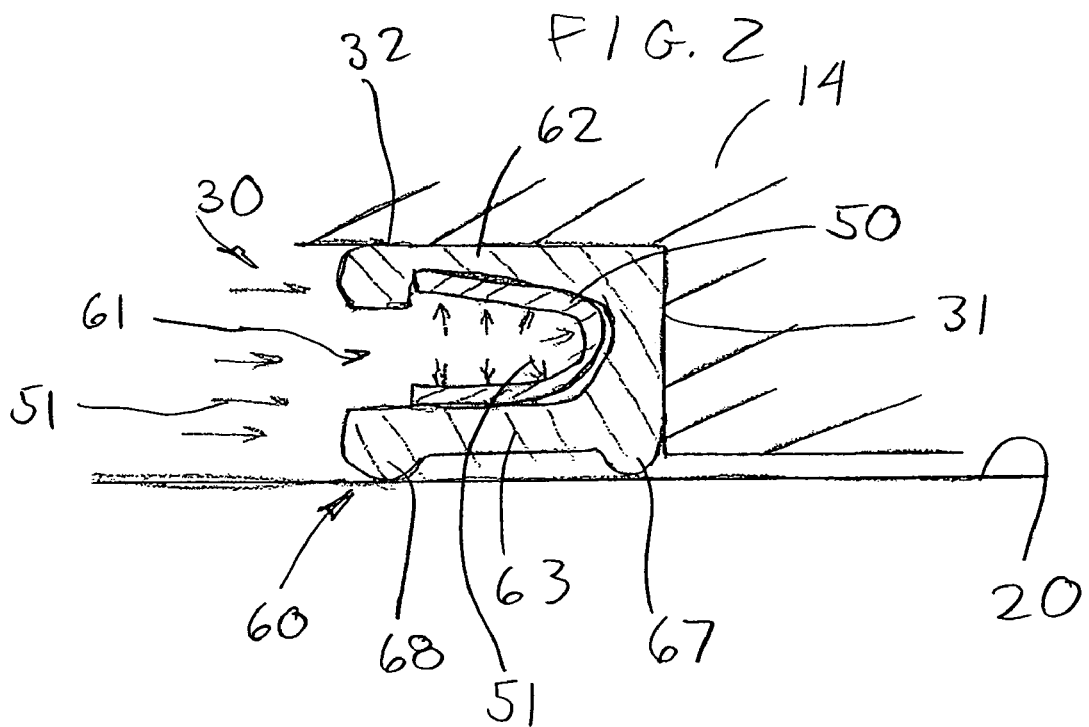
FIG. 3 illustrates a prior art gasket in a second configuration.

Referring to FIGS. 2 and 3, alternative gasket constructions are illustrated. As to FIG. 2, the pocket 30 is shown in the seal ring 14 as having the end face 31 and side face 32 which is disposed in opposing relation with the component surface 20. There may be relative axial movement between the opposed faces 20 and 32. The alternate gasket 42 is shown in FIG. 2 as having a U cup shape defined by a gasket end wall 43, and opposite sealing lips or gasket walls 44 and 45, which extend axially and are disposed respectively in contact with the component surfaces 32 and 20. This gasket 42 is of a spring-energized type wherein an annular, U-shaped spring 46 is inserted within the groove 47 formed in the gasket 42. This spring 46 has opposite spring legs 48 and 49 which are joined together by a deflectable bight portion 50, which spring legs 48 and 49 press the gasket legs 44 and 45 radially away from each other into improved sealing contact with the faces 32 and 20.

It is noted that these gasket walls 44 and 45 respectively define sealing surfaces 44A and 45A which press against the pocket face 32 and component face 20 and can be adequate to generate a secondary seal in this region. However, the enlarged area of the contact surfaces 44A and 45A can impede and cause hang-up of the gasket 42 during relative axial motion between the opposed faces 32 and 20. This is further exaggerated when the increased hydraulic pressure as indicated by reference arrows 51 flows into the gasket groove 47 and further increases the radial pressure biasing the legs 44 and 45 radially away from each other. The difficulties associated with this gasket construction are also described above in the background.

In an effort to overcome some of these disadvantages, the gasket 60 of FIG. 3 includes a similar construction having a groove 61 defined between gasket walls or sealing lips 62 and 63 which are biased outwardly by a spring 50 formed substantially similar to that described above. To reduce the propensity for gasket hang-up during relative axial motion between the opposed faces 20 and 32, at least the gasket leg 63 may be provided with rib-like protrusions 67 and 68 which define annular line contact with the contact surface 20 or least define a reduced contact area between such gasket walls 63 and the surface 20. However, the hydraulic pressure indicated by reference arrows 51 still biases the legs 62 and 63 away from each other which increases the frictional resistance to any axial sliding movement between the gasket leg 63 and the opposed component surface 20.

Figures 4, 5:
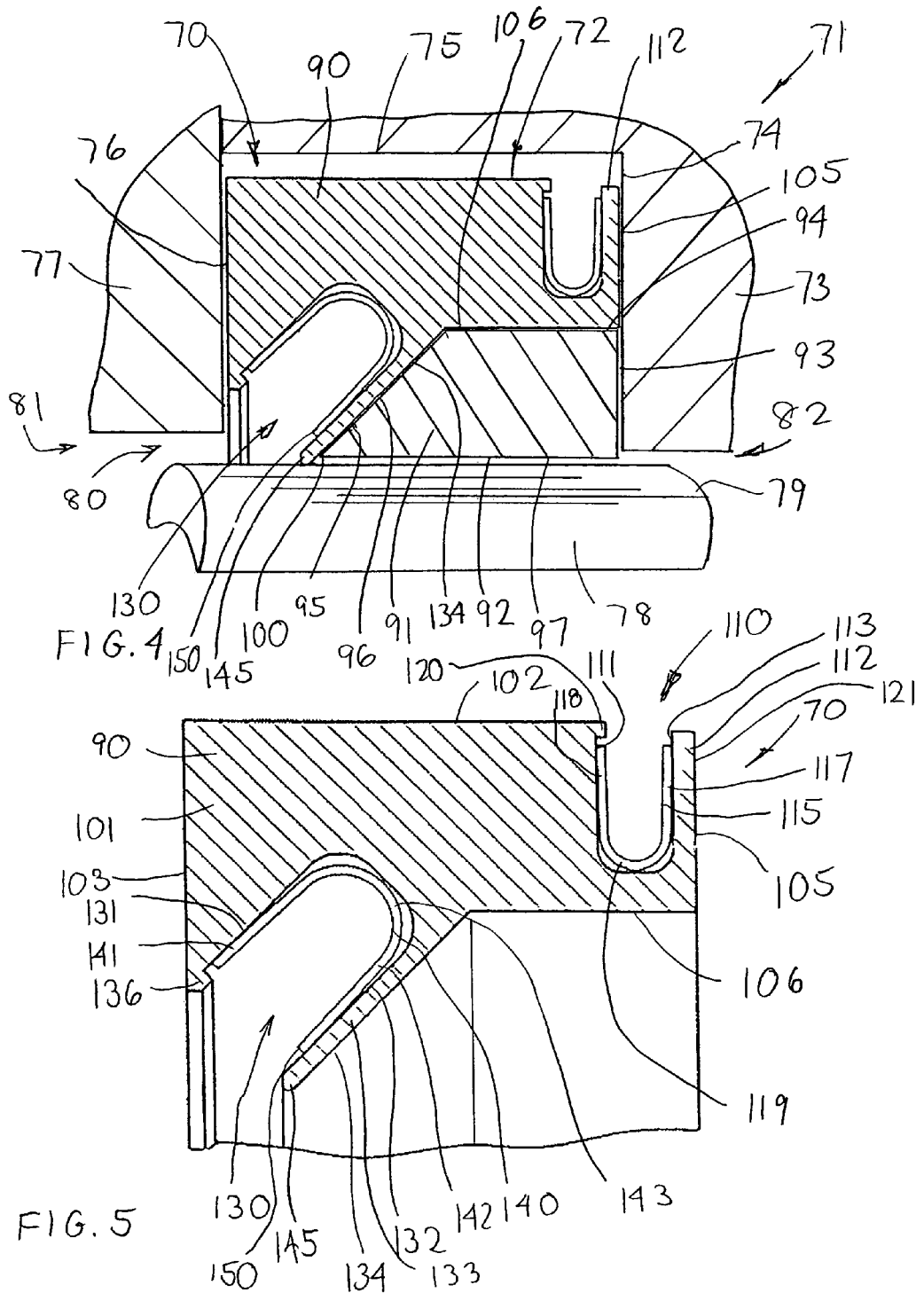
FIG. 4 illustrates a spring-energized gasket assembly of the invention.
FIG. 5 illustrates the gasket thereof.

To overcome these disadvantages, the invention relates to the improved gasket construction illustrated in FIGS. 4 and 5.

The gasket arrangement comprises a gasket unit or assembly 70 which mounts within different types of pockets formed in mechanical seals. In the embodiment of FIG. 1, the gasket assembly can be positioned within the pocket 30 and replace the existing gasket 40. FIG. 4 illustrates a modified mechanical seal 71 which includes a pocket 72 formed similar to the above-described pocket 30. In this regard, the mechanical seal 71 includes a seal ring 73 provided with the pocket 72 wherein such pocket 72 is defined by an axial-facing end face 74 and a radially inward-facing side face 75. The opposite end of the pocket 72 is closed by an axial-facing end face 76 defined by a seal component 77 which is formed similar to the seal component 18 described above.

In the illustrated embodiment of FIG. 4, the seal component 78 may be an annular sleeve like the inner seal component 19 described above which are stationarily supported on the seal housing. As such, the outer circumferential sealing surface 79 faces radially outwardly and defines the opposing sealing surface which is positioned for contact with the seal assembly 70. The seal ring 73 may then remain stationary during shaft rotation. This sealing surface 79 could also be the outer surface 20 of a rotatable shaft if the seal ring 73 is rotatably supported on the shaft or a shaft sleeve for rotation therewith.

The gasket assembly 70 is configured to seal the radial clearance space 80 that is defined radially between the sealing surface 79 and the surrounding seal component 77 and seal ring 73. As mentioned in the background, it is highly desirable that the seal assembly 70 be positioned so as to avoid radial pressures on the seal ring 73 which can cause seal face distortion of the lapped seal faces. In this regard, the gasket assembly 70 radially seals the space 80 and axially separates a first side chamber 81 from a second side chamber 82 which normally would be in fluid communication with each other through the space defined by the pocket 72. However, the positioning of the gasket assembly 70 in this pocket 72 sealingly separates these first and second chambers 81 and 82 from each other such that the gasket assembly 70 defines a secondary seal for this mechanical seal 71.

Preferably, the gasket unit or assembly 70 comprises a machined gasket 90 which is provided in combination with an annular support ring 91. This support ring 91 generally has an annular shape disposed in surrounding relation to the circumferential sealing surface 79 wherein the support ring has an inner face 92 which faces opposite to the sealing surface 79. The support ring 91 also has an end face 93 which faces the pocket end face 74, and an outer ring surface 94 which faces towards the gasket 90. The opposite end of the support ring 91 has a beveled or canted edge 95 which defines an angled support surface 96 which faces axially towards the end face 76 and radially towards the pocket side face 75. The angle between the support surface 96 and inner surface 92 preferably is at an acute angle less than 90 degrees and preferably is about 45 degrees relative to the inner surface 92 so that the support surface 96 essentially is canted relative to such inner surface 92. The opposed sealing surface 79 and inner ring surface 92 are proximate to each other but there is sufficient difference to create a radial clearance space 97 therebetween which allows for axial sliding of the support ring 91 into position, and also allows for relative axial movement of the seal component 78.

The canted support surface 96 extends from the outer surface 94 radially inwardly towards a terminal edge 100 formed at the apex of the support surface 96 and the inner ring surface 92. Hence, this apex 100 also has a radial space disposed outwardly of the sealing surface 79.

Next as to the gasket 90 as seen in FIGS. 4 and 5, the gasket 90 has a generally block-like main body 101 defined by an outer body surface 102 which is spaced from but faces towards the pocket side surface 75. The main body 101 further includes a gasket end face 102 which has a relatively large radial dimension extending inwardly from the gasket surface 102 so as to be disposed for closely adjacent, abutting contact with the component end face 76. For diagrammatic purposes, FIG. 4 illustrates small spaces between the gasket 90 and the opposing end faces 74 and 76, although it will be understood that such end faces 74 and 76 preferably are disposed in axially compressive contact with the gasket 90.

The opposite end of the gasket 90 forms a deformable end face 105 which is positioned closely adjacent to and is disposed for sealing contact with the pocket end face 74 as will be described further herein. The inner diameter of the gasket 90 also is formed by an interior gasket face 106 which faces radially inwardly towards the outer ring face 94, which surfaces have substantially the same axial length as seen in FIG. 4.

To effect sealing of the gasket 90 between the seal components 73 and 78, the gasket 90 is formed with a plurality of separated U cup formations to seal at different locations within the pocket 72. In particular, the gasket 90 is provided with a first U cup groove 110 which preferably opens radially outwardly and is defined by the main body 101 that defines one interior cup surface 111, and an outer groove wall 112 which defines a second groove surface 113. The groove wall 112 essentially functions as a sealing lip that is bendable in response to biasing by an inner spring 115. This inner spring 115 has a U-shape defined by opposite spring legs 117 and 118 which are joined together by a bight portion 119. The main body 101 is provided with an outer circumferential rib 120 which projects into the groove 110 and prevents unwanted removal of the spring 115.

The spring legs 117 and 118 are in resiliently deflected compression so that the spring legs 117 and 118 press outwardly away from each other and effect limited deformation or outward bending of the groove wall 112. This groove wall 112 thereby can deflect and press axially against the opposing component surface 74, and preferably that end face 74 defined by the seal ring 73. Hence, the gasket wall 112 defines a sealing face 121 which is disposed in sealing contact with the end face 74. Since the gasket wall 112 is pressed axially against this surface 74, the forces generated by the gasket 90 only act axially on the seal ring 73 and do not cause radial distortion of the seal face which otherwise may be a problem with the prior art constructions illustrated in FIGS. 1-3. It will be understood that while the gasket groove 110 opens radially outwardly, the gasket groove 110 also could be reversed so as to open radially inwardly such that the gasket groove 110 may be able to be hydraulically pressurized either by opening radially outwardly or by opening radially inwardly depending upon which chamber 81 or 82 contains the pressurized fluid of the equipment on which the mechanical seal 10 is installed. Additionally, the seal component 78 is oriented so that its central axis extends horizontally, but if this seal component 78 were oriented vertically, the gasket assembly 70 would also be re-oriented 90 degrees such that it would be said that the gasket groove 110 opens either leftwardly or rightwardly or to use equivalent terminology, open radially outwardly or radially inwardly. In these different configurations, the gasket groove 110 therefore can open radially in the preferred embodiment.

In addition to the secondary seal defined at the first location between the gasket sealing surface 121 and the end face 74, the gasket 90 also is provided with a second U cup formation defined by a gasket groove 130. As seen in the figures, the gasket groove 130 preferably is canted at an angle relative to the surface 79 against which it seals. This groove 130 thereby is defined by an inner groove surface 131, an outer groove surface 132. The outer groove surface 132 is defined by a groove wall 133 that functions as a sealing lip that extends at a canted angle relative to the gasket surfaces 106 or 103. Preferably, the angle of the groove 130 is approximately 45 degrees relative to a groove wall surface 134 that is defined on the outer face of the groove wall 133. The inner groove surface 131 also terminates at an annular lip 136 which serves to retain a spring 140 therein. The spring 140 is defined by inner and outer spring legs 141 and 142 which are connected together by an arcuate bight 143 so that the spring legs 141 and 142 press the gasket wall 133 and the outer sealing surface 134 away from the opposite groove surface 131.

The groove wall 133 extends outwardly and terminates at a distal sealing lip 145 so as to be positioned for sealing contact with the shaft sealing surface 79 as seen in FIG. 4.

This sealing lip 145 has a minimal contact area with the sealing surface 79 so as to define a secondary seal therebetween while still minimizing the contact area that otherwise might generate friction if the sealing surface 79 were to move axially relative to the gasket assembly 70.

More particularly, the gasket wall 134 preferably is formed so as to have a substantially thin thickness to facilitate flexing of the gasket wall 134 under the spring loads generated by the spring 140. In this regard, the aforementioned support ring 91 is provided wherein the inclined support surface 96 extends substantially along almost all of the angled length of the wall surface 134. As seen in FIG. 4, only a small portion or small extent of the sealing lip 145 extends radially inwardly beyond the terminal edge 100 of this support surface 96 so that the spring will flatten the gasket wall 134 against the support surface 96 and bias the sealing lip 145 into contact with the sealing surface 79. The support surface 96 therefore carries the spring load from spring 143.

Further, it is noted that the spring leg 142 terminates at a distal or terminal edge 150 wherein the sealing lip 145 extends an additional distance beyond this spring edge 150 as seen in FIG. 4. Hence, the gasket wall 134 supported up to this spring edge 150 which will substantially resist deflection of the gasket wall 134 except that the extending end portion defined at the sealing lip 145 extends beyond the spring edge 150 in cantilevered relation and is still able to flex relative to this spring edge 150. As a result, the sealing lip 145 is able to maintain adequate contact against the surface 79 and generate a secondary seal therebetween, but there is still sufficient flexure by the thin gasket wall 134 at the cantilevered end portion extending beyond the spring edge 150 so that minimal frictional contact is generated between the sealing lip 145 and surface 79. As such, an adequate seal is formed, but the sealing lip 145 greatly reduces the frictional contact and stiction which may be encountered in the region of sealing contact.

This break-out friction of the gasket assembly 70 is substantially lower than that generated by conventional U-cup type gaskets. Even if the gasket groove 130 is hydraulically loaded and the gasket wall 134 is pressed harder against the inclined support surface 96, this still has a minimal impact or increase upon the sealing force generated by the sealing lip 145 since the hydraulic pressure only acts on the radial area of the sealing lip 145 that is disposed radially beyond the ring edge 100.

Further, the second groove 130 opens radially inwardly, although it is understood that the gasket 90 also could be reversed so that the groove 130 opens radially outwardly and the annular support ring 91 is formed larger so as to extend about the outer circumference of the gasket 90.

The invention therefore relates to a gasket 90 having first and second grooves that are spring-energized by appropriate spring structures or biasing members which fit into such grooves. The plurality of grooves each define a groove wall that acts against an opposing sealing surface in different directions. In the illustrated embodiment, one groove wall 112 acts axially, while the second groove wall 134 essentially acts transverse to the axial direction against a sealing surface 79 that is oriented in a transverse orientation, and preferably at a right angle relative to the sealing surface 74.

During installation, the gasket assembly 70 may be installed from the left end of the illustrated seal component or sleeve 78 and slid along the seal component 78. It is possible for the gasket wall 134 to flex slightly to the left so that there is some small gap formed between the gasket wall 134 and the support surface 96. The gap would be minimized due to the opposing biasing force generated by the spring 140, and the gap may be closed by such spring 140 or upon hydraulic loading of the gasket groove 130 during operation. When the groove 130 is subjected to a hydraulic load, fluid pressure will cause some increase of the contact force between the sealing lip 145 and the sealing surface 79, although this is still minimized so as to reduce the frictional break-out force required for sliding of the gasket assembly 70 during normal seal operation.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. An annular secondary seal gasket unit for a sealing device, comprising:
   an annular support ring comprising opposite first and second ring side surfaces which extend axially and face in opposite radial directions, and a support surface disposed at one end of said support ring, said support surface being canted at an acute angle relative to said first ring side surface; and
   an annular gasket fitted in close engagement with said second ring side surface, said gasket comprising a first groove which extends radially into said gasket to define a deflectable groove wall that is deflectable axially to form a first seal between said gasket and an opposing sealing surface, said gasket further including a second groove which extends at an angle into said gasket so as to be canted at an acute angle relative to said first ring side surface and define a canted groove wall which is deflectable toward said support surface and extends along said support surface of said support ring in supported engagement therewith, said canted groove wall extending radially past said support surface to define an unsupported sealing lip disposed radially beyond said first ring side surface for sealing contact with an opposing sealing surface of a component surface; and
   each of said first and second grooves including respective biasing members which respectively bias said first groove wall and said canted groove wall into sealing contact with a respective sealing surface.

2. The gasket unit according to claim 1, wherein said biasing members comprise annular biasing springs having a U-shaped cross section defined by opposite spring legs.

3. The gasket unit according to claim 2, wherein said spring legs fit within said first and second grooves and press outwardly away from each other.

4. The gasket unit according to claim 2, wherein said spring legs each have a terminal edge disposed respectively within said first and second grooves.

5. The gasket unit according to claim 4, wherein said terminal edge of said spring leg acting on said canted groove wall terminates within said second groove so as to press said canted groove wall directly against said support surface, said canted groove wall extending beyond said terminal edge to define said sealing lip.

6. The gasket unit according to claim 1, wherein said sealing lip extends radially beyond said biasing member so as to be unsupported by said biasing member and said support surface.

7. The gasket unit according to claim 1, wherein said first and second grooves are each closed on three sides and open on a fourth open side wherein said open sides of said first and second grooves open in non-parallel, transverse directions.

8. An annular secondary seal gasket unit for a sealing device, comprising:
   an annular support ring comprising opposite first and second ring side surfaces which extend axially and face in opposite radial directions, and a support surface disposed at one end of said support ring, said support surface being canted at an acute angle relative to said first ring side surface; and
   an annular gasket comprising opposite first and second gasket side surfaces which extend axially and face in opposite radial directions, said gasket being fitted in close engagement with said second ring side surface, said gasket further comprising opposite first and second gasket ends wherein said first gasket end has a first end face which faces axially for sealing contact with an opposing component surface of a sealing device in which said gasket is mountable;
   said gasket including a first groove which extends radially into said gasket proximate said first end face to define a deflectable groove wall that defines said first end face such that said groove wall is deflectable axially to form a first seal between said gasket and an opposing component surface; and said gasket including a second groove which extends at an angle into said gasket so as to be canted at an acute angle relative to said first ring side surface and define a canted groove wall which is deflectable and extends along said support surface of said support ring so as to be supported by said support surface, said canted groove wall extending radially past said support surface to define an unsupported sealing lip radially beyond said first ring side surface for sealing contact with an opposing sealing surface of a component surface.

9. The gasket unit according to claim 8, wherein each of said first and second grooves includes an annular biasing spring which respectively bias said first groove wall and said canted groove wall into sealing contact with a respective sealing surface, said biasing springs having a U-shaped cross section defined by opposite spring legs wherein said spring legs fit entirely within said first and second grooves, and said spring leg acting on said canted groove wall has a terminal edge that terminates within said second groove so as to press said canted groove wall directly against said support surface.

10. The gasket unit according to claim 9, wherein said canted groove wall extends beyond said terminal edge to define said sealing lip.

11. The gasket unit according to claim 8, wherein said first and second grooves are each closed on three sides and open on a fourth open side wherein said open sides of said first and second grooves open in non-parallel, transverse directions.

12. The gasket unit according to claim 8, wherein said first and second grooves each include an annular biasing spring which respectively bias said first groove wall and said canted groove wall into sealing contact with a respective sealing surface, and said support surface supports spring loads from said biasing springs.

13. The gasket unit according to claim 8, wherein said sealing lip extends a small extent beyond said first side ring surface and is unsupported along said small extent to permit deflection of said sealing lip in opposite directions transverse to said canted groove wall.

14. A mechanical seal assembly comprising:
a plurality of seal components which define a sealing pocket defined by opposing, radially spaced pocket sides, and opposing, axially spaced pocket ends wherein said seal assembly includes an annular secondary seal gasket unit disposed in said pocket;
said gasket unit comprising:
an annular support ring comprising opposite first and second ring side surfaces which extend axially and face in opposite radial directions toward said pocket sides, and a support surface disposed at one end of said support ring, said support surface being canted at an acute angle relative to said first ring side surface; and
an annular gasket fitted in close engagement with said second ring side surface, said gasket comprising a first groove which extends radially into said gasket to define a deflectable first groove wall that is deflectable axially to form a first seal between said gasket and a first sealing surface defined on an opposing one of said pocket ends, said gasket further including a second groove which extends at an angle into said gasket so as to be canted at an acute angle relative to said first ring side surface and define a canted groove wall which is deflectable and extends along said support surface of said support ring in supported engagement therewith, said canted groove wall extending radially past said support surface to define an unsupported sealing lip radially beyond said first ring side surface which is positioned in sealing contact with a sealing surface defined on an opposing one of said pocket sides; and
each of said first and second grooves including respective biasing members which bias said first groove wall and said canted groove wall for sealing contact with said sealing surfaces.

15. The mechanical seal assembly according to claim 14, wherein said seal components comprise relatively rotatable seal rings, said first groove wall acting axially on said first one of said pocket ends which is defined by an axial-facing back face on one of said seal rings.

16. The mechanical seal assembly according to claim 15, wherein said first seal is defined by contact between said gasket and said back face of said seal ring.

17. The mechanical seal assembly according to claim 15, wherein said gasket is confined axially between said opposite pocket ends.

18. The mechanical seal assembly according to claim 17, wherein said sealing lip acts radially against said opposing one of said pocket sides transverse to the axial action of said first groove wall against said first one of said pocket ends.

19. The mechanical seal assembly according to claim 14, wherein said sealing lip acts radially against said opposing one of said pocket sides transverse to the axial action of said first groove wall against said first one of said pocket ends.

20. The mechanical seal assembly according to claim 14, wherein said first ring side surface is disposed proximate said sealing surface wherein said sealing lip extends a small extent therebetween.

* * * * *